(12) United States Patent
Haberman et al.

(10) Patent No.: US 10,887,665 B2
(45) Date of Patent: Jan. 5, 2021

(54) VALUE-BASED TV ADVERTISING AUDIENCE EXCHANGE

(71) Applicant: Visible World, LLC, Philadelphia, PA (US)

(72) Inventors: Seth Haberman, New York, NY (US); Gerrit Niemeijer, Maplewood, NJ (US); Robert Bress, New Providence, NJ (US); Claudio Marcus, Andover, NH (US)

(73) Assignee: Visible World, LLC, Philadelphia, PA (US)

( * ) Notice: Subject to any disclaimer, the term of this patent is extended or adjusted under 35 U.S.C. 154(b) by 0 days.

(21) Appl. No.: 15/399,561

(22) Filed: Jan. 5, 2017

(65) Prior Publication Data
US 2017/0195747 A1 Jul. 6, 2017

Related U.S. Application Data

(60) Provisional application No. 62/274,944, filed on Jan. 5, 2016.

(51) Int. Cl.
| | |
|---|---|
| *H04N 21/81* | (2011.01) |
| *H04N 21/442* | (2011.01) |
| *H04N 21/2547* | (2011.01) |
| *H04N 21/262* | (2011.01) |
| *H04N 21/234* | (2011.01) |
| *H04N 21/45* | (2011.01) |
| *H04N 21/858* | (2011.01) |

(52) U.S. Cl.
CPC ..... *H04N 21/812* (2013.01); *H04N 21/23424* (2013.01); *H04N 21/2547* (2013.01); *H04N 21/26241* (2013.01); *H04N 21/44222* (2013.01); *H04N 21/4532* (2013.01); *H04N 21/858* (2013.01)

(58) Field of Classification Search
CPC .......................... G06Q 30/02; H04N 21/812
See application file for complete search history.

(56) References Cited

U.S. PATENT DOCUMENTS

| | | | |
|---|---|---|---|
| 9,137,557 B1 | 9/2015 | Sandoval et al. | |
| 2006/0190290 A1* | 8/2006 | Gomez | G06Q 30/06 705/26.1 |
| 2012/0041835 A1 | 2/2012 | Broms et al. | |
| 2012/0221408 A1* | 8/2012 | Pych | G06Q 30/0251 705/14.43 |

(Continued)

*Primary Examiner* — Michael H Hong
(74) *Attorney, Agent, or Firm* — BakerHostetler

(57) ABSTRACT

Systems, methods and computer-readable media for a decentralized application system that enables participating parties to automate the buying and selling of TV media units and/or aggregated TV and premium video audiences is described. The value-based TV/premium video media exchange application system allows the participants to interact with the system directly and/or automate transactions and execution between systems, while ensuring proper governance over each participants own rules and economics associated with the transactions, as well as individual campaign constraints and requirements. The decentralized application system significantly lowers current transaction and execution barriers, timing and costs, while providing a highly accountable and trusted system across all of the exchange participants.

20 Claims, 5 Drawing Sheets

(56) References Cited

U.S. PATENT DOCUMENTS

| | | |
|---|---|---|
| 2013/0060632 A1 | 3/2013 | Gadhia et al. |
| 2014/0149230 A1* | 5/2014 | Shepard ............. G06Q 30/0273 |
| | | 705/14.69 |
| 2015/0278820 A1* | 10/2015 | Meadows ........ G06Q 20/40145 |
| | | 705/64 |
| 2015/0348091 A1 | 12/2015 | Haberman et al. |

* cited by examiner

VALUE-BASED TV ADVERTISING AUDIENCE EXCHANGE

CROSS REFERENCE TO RELATED APPLICATIONS

This application claims the benefit of U.S. Provisional Application No. 62/274,944 filed on Jan. 5, 2016, the entirety of which is incorporated herein by reference.

FIELD OF INVENTION

Embodiments of the present invention related to the transmission of media content, more particularly to a decentralized application system that enables the automated exchange of media inventory.

BACKGROUND

Traditional methods and systems for planning and scheduling the distribution of media content, such as advertising content, are based on media inventory that is managed independently within a company. Rarely is the media inventory aggregated, enhanced or exchanged with external partners. Current carriage agreements between programmers (television networks) and local operators (TV stations) and multi-channel video programming distributors ("MVPDs")) set aside media inventory to be managed by local operators, however these arrangements are typically static multi-year contracts and not dynamic media exchanges like those widely used in the digital content ecosystem. The inability to easily exchange TV media inventory between companies limits revenue generation potential relative to an open marketplace where inventory can be sold, enhanced or bought by any qualified partner.

Given these challenges, there is an opportunity to develop a system that enables television media inventory owners to readily exchange inventory. Advances in methods and systems that enable impression-based TV advertising campaign sales to deliver the contracted audience serve as the foundation to solve the outlined business problem. Exemplary systems and methods are described in further detail in U.S. patent application Ser. No. 14/729,873, entitled "Dynamic Television Advertising Schedule Optimization And Execution," filed Jun. 3, 2015, the contents of which are hereby incorporated by reference in its entirety.

SUMMARY

The methodology described here provides methods and systems for a decentralized system that enables participating parties to automate the buying and selling of TV media units and/or aggregated TV and premium video audiences. The value-based TV/premium video media exchange application system allows the participants to interact with the system directly and/or automate transactions and execution between systems, while ensuring proper governance over each participants own rules and economics associated with the transactions, as well as individual campaign constraints and requirements. The decentralized application system significantly lowers current transaction and execution barriers, timing and costs, while providing a highly accountable and trusted system across all of the exchange participants.

According to one embodiment of the system, a system for an electronic exchange of media inventory data between an inventory owner, and an audience buyer is disclosed. The system includes a processor and a non-transitory, computer-readable storage medium in operable communication with the processor, wherein the computer-readable storage medium contains one or more programming instructions that cause the processor to receive a link to an inventory application programming interface, the inventory application programming interface linking the system to inventory data from an inventory owner, the media inventory data comprising a plurality of units. The processor will also receive a campaign request from an audience buyer, the campaign request comprising a request for at least one media unit, compare the campaign request with the media inventory data for a match, and upon finding the match between the campaign request and media inventory data, automatically generate and store a proposal. Then the system may transmit the proposal to the audience buyer, receive a response to the proposal from the audience buyer, and upon receiving a confirmation response from the audience buyer, execute the campaign request and distribute the proposal to the inventory owners, wherein the inventory owners transmit the at least one media unit to an ad insertion unit.

Further embodiments may include a system wherein the system may receive a link to a services application programming interface, the services application programming interface linking the system an exchange partner; wherein the services application programming interface provides access to a value-add service offered by the exchange partner. The value-add service may include an audience determination and the audience determination may further include audience size and audience composition.

Additional embodiments may include the value-add service being audience aggregation, where the audience aggregation generates at least one pool of audiences with at least one share characteristic. Additionally, the value-add service comprises audience valuation. The system may also automatically execute a value-based optimization of the executed campaign and the value-based optimization may occur during an execution period of the campaign. Further, the system may include a decentralized application.

BRIEF DESCRIPTION OF THE DRAWINGS

The above and other objects of the present invention will become more readily apparent from the following detailed description taken in connection with the accompanying Drawings, in which.

DETAILED DESCRIPTION

Figure 1:
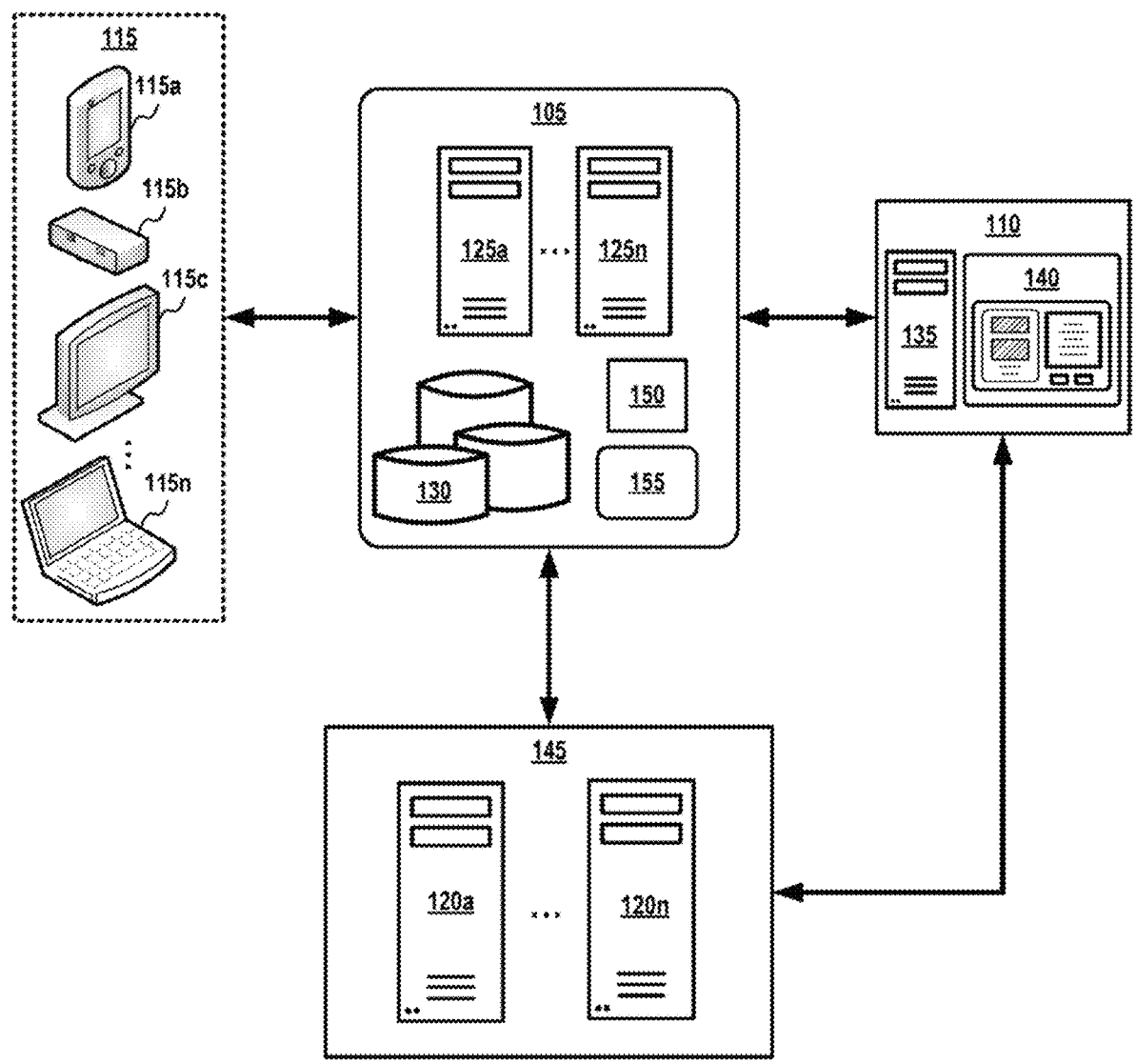
FIG. 1 depicts an illustrative management system according to some embodiments.

Throughout this disclosure, where compositions are described as having, including, or comprising specific components, or where processes are described as having, including or comprising specific process steps, it is contemplated that compositions of the present teachings also consist essentially of, or consist of, the recited components, and that the processes of the present teachings also consist essentially of, or consist of, the recited process steps.

In this disclosure, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, a system, and/or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise. As used in this document, the term "comprising" means "including, but not limited to."

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the present teachings also include the specific quantitative value itself, unless specifically stated otherwise.

It should be understood that the order of steps or order for performing certain actions is immaterial so long as the present teachings remain operable. Moreover, two or more steps or actions may be conducted simultaneously.

The terminology used in the description is for the purpose of describing the particular versions or embodiments only, and is not intended to limit the scope.

The described technology generally relates to systems, methods, and computer readable media for a decentralized application system that enables participating parties to automate the buying and selling of TV media units and/or aggregated TV and premium video audiences. The decentralized application system significantly lowers current transaction and execution barriers, timing and costs, while providing a highly accountable and trusted system across all of the exchange participants.

Although advertisers and advertising content assets may be used in examples in this disclosure, embodiments are not so limited, as any type and form of content capable of operating according to embodiments is contemplated herein. Non-limiting examples of content assets include messages, entertainment programming, and/or informational programming available over any type of applicable medium, including, but not limited to, television, radio, and electronic communication media (for example, Internet web sites, software applications, including mobile applications, "mobile apps" or "apps").

A campaign may generally refer to a series of content presentations (e.g., "creatives") generally related by a common idea or theme. An illustrative campaign may include an advertising campaign associated with various advertisements involving a common product or service. Advertisers may have several campaigns running simultaneously. Each campaign may be multiple weeks in length, during which advertisers' creatives, targeting, and daily budget may change. An advertiser content originator may purchase a large set of inventory (e.g., time slots on a television station, display elements, such as a banner advertisement, on a web page, etc.) and provide content originator information relating to mapping the campaign content assets onto the purchased inventory.

Inventory may generally include available recipients at one or more particular times. In some embodiments, inventory may comprise a plurality of inventory slots, with each slot including one or more targets at a particular time. For example, an inventory slot may comprise a set of set-top-boxes within a cable network during prime time viewing hours on a particular television channel. Each inventory slot may be associated with a value or price indicating the cost associated with placing content therein.

A content asset (or "content") may generally include any type of data, information, media, or the like that may be expressed through a medium. Illustrative mediums may include audio and visual mediums such as television, radio, and broadcast, cable, satellite, and/or network (e.g., the Internet) forms thereof. Examples of content may include, but are not limited to, video, audio, movies, video games, television and radio programs, commercials, websites, images, photographs, text, electronic or digital documents, information feeds, streaming media, social media, social networks, and/or combinations thereof. In some embodiments, content may include an advertisement, such as a television advertisement or an online advertisement including, without limitation, website advertisements, Internet advertisements, search engine marketing (SEM), social media marketing, and mobile device advertising.

The content assets may be distributed or broadcast by a service provider to various content presentation devices. A service provider may generally include any type of entity or structure capable of providing content assets to a content presentation device. For instance, the service provider may include a television broadcast network, a cable television network, a satellite television network, an internet service provider (ISP), a computing device advertising network, a media distribution network, a cloud computing network, a local area network (LAN), a wide area network (WAN), a terrestrial network, a mobile network, and/or any combination thereof. Television networks may include standard definition (SD) and high definition (HD) networks.

In some embodiments, the management system may be configured to operate across physical device platforms, networks, and/or service providers simultaneously. For example, content assets and/or a distribution schedule thereof, such as an advertising campaign, may be managed by the management system in association with set-top-boxes over a cable television system, mobile computing devices using standard network communication protocols (for instance, Ethernet or Wi-Fi) over an Internet service provider network, and/or to smart phone devices over standard telecommunication protocols (for instance, 3G, 4G, LTE, or the like).

A content presentation device may generally include any device now known to those having ordinary skill in the art or developed in the future that is capable of presenting content assets to a viewer or other type of content consumer. Non-limiting examples of content presentation devices include televisions, smart televisions, laptops, personal digital assistants (PDAs), tablet computing devices, smartphones, personal computers (PCs), display monitors or terminals, radios, audio devices, speakers, headphones, haptic devices, electronic reading devices ("e-readers"), light emitting diode (LED) devices, organic LED (OLED) devices, wearable screens, set-top-boxes, satellite receivers, video-on-demand (VOD) receivers, content receivers (e.g., Apple TV® manufactured by Apple Inc. of Cupertino, Calif., United States; Roku® manufactured by Roku, Inc. of Saratoga, Calif., United States), digital video recorders (DVRs), personal video recorders (PVRs), hard drives, flash drives, storage servers, digital video disc (DVD) devices, Blu-Ray™ devices, or the like. A recipient, viewer, audience member, or the like may generally include an individual viewing, consuming, recording, streaming, or otherwise interacting with a content asset using a content presentation device.

A content originator may include any entity capable of providing content assets for distribution by a service provider. A content originator may include any type of content developer known to those having ordinary skill in the art, such as an advertiser, an advertising agency, a television studio or broadcast network, a radio channel, a website provider, a VOD service, a content storage and delivery service, or the like. An advertiser content originator may have advertisement content assets associated with one or more products or brands that they seek to have distributed by a service provider according to content originator information, which may include, without limitation advertising campaign information, campaign goals and/or constraints, campaign target information, or the like. Goals are typically expressed as a combination of budget and reach and frequency of exposure targets. Typically, the content originator (or "buyer") may attempt to meet, or get as close as possible to, the campaign goals while staying within budget. The content originator and/or service provider may look at various information, such as ratings data, inventory pricing, and commercial or TV spot rotations, to derive an optimal allocation of inventory against the goals. This process may be performed for a single product with a single advertisement, or for a single product with multiple advertisement (for example, with different target demographic audiences), for multiple products (for example, with each product being associated with one or more advertisements), for multiple advertisers (for example, with one or more advertisements each), or various combinations thereof.

According to exemplary embodiments of the invention, a distributed system runs on a network in a distributed fashion with participant information securely protected and operation execution decentralized across network nodes. An early example of a distributed application was BitTorrent, which allowed users to distribute digital content quickly and easily without the use of a centralized system. A few years later, Satoshi Nakamoto created a Blockchain, a distributed data-based application, which was used to build Bitcoin, the world's first decentralized currency. Blockchain allows users from around the world to safely and securely exchange this new form of money. In essence, this technology can allow for data to be stored in a variety of different places to enable secure implementation of business rules and the tracking of media inventory, audiences and value-added contributions from various participating parties as well as related transactions such as execution and disbursement of economic compensation based on the value-contribution rules associated with each transaction.

According to one embodiment of the invention, a value-based TV/premium video media exchange enables the transfer of media, such as TV advertising units and audiences, from the creation of a unit of value through every value-add enhancement and/or transaction (i.e., every time a unit is transferred, aggregated or divided). Unique to this exemplary value-based TV/premium video media exchange implementation are Gateways that, among the intelligent peer-to-peer node communications, interface with the traditional traffic and billing systems, as well as interface with the ad insertion systems to enable automated execution of related advertising campaigns. These Gateways can also monitor the execution of the campaigns, providing the essential confirmations of performance necessary to validate execution. Providing an important function in the context of the exemplary value-based TV/premium video exchange, the Gateways provide access to detailed "as-run" information needed for participants to be compensated for their relative value-added contribution to each executed campaign.

In a traditional sense, a typical TV media sales contract, such as an advertising sales contract, involves an agreement between a seller and a buyer to execute or not execute an ad insertion order based on some agreed upon level of compensation. Each party must trust the other party to fulfill its side of the obligation, and third party information services such as TV ad detection and audience measurement companies serve to validate whether the agreed upon terms were met. According to an embodiment of the invention, an exemplary distributed value-based TV/premium video media exchange incorporates a similar agreement to act or not act, however the decision making can be defined within the application system and automatically executed and enforced by the code.

According to one embodiment, three key elements can make the distributed value-based TV/premium video media exchange distinct. Those elements include autonomy, self-sufficiency, and decentralization: Autonomy, according to one embodiment, means that after a campaign is launched and running, a contractor and its initiating agent need not be in further contact. Self-sufficiency relates to the ability to automatically manage the incorporation of value-added services such as inventory aggregation, data-matching and analytics to determine audience valuation. Self-sufficiency may also include the ability to manage other services and resources, such as TV ad detection and audience measurement, or even operational requirements such as cloud-based processing power or storage. Decentralization, according to one embodiment, can be essential in that the application system may not subsist on a single centralized server, as the value-based TV/premium video media exchange is distributed and self-executing across all of its related network nodes.

According to certain embodiments of the invention, the value-based TV/premium video media exchange builds on the foundational advances in methods and systems that enable impression-based TV advertising systems and methods, such as those detailed in U.S. patent application Ser. No. 14/729,873, entitled "Dynamic Television Advertising Schedule Optimization And Execution," filed Jun. 3, 2015, the contents of which are hereby incorporated by reference in its entirety. Such systems enable an aggregated view of audiences across linear TV and non-linear video-on-demand ("VOD")/premium video advertising inventory and are able to manage related audience estimation, planning, proposal generation, scheduling and execution, across many TV campaign schedules in order to optimally deliver the impression and other goals of the active campaigns.

FIG. 1 depicts an illustrative management system according to some embodiments. As shown in FIG. 1, a service provider 105 may be configured to distribute content to various content presentation devices 115a-n. For example, the service provider 105 may be a cable television provider configured to distribute television programs and advertisements to subscriber set-top boxes 115b and/or televisions 115c. The service provider 105 may include service provider computing devices 125a-n and may be in communication with service provider databases 130, which may include historical measurement information, inventory information, and/or other information associated with the service provider and/or the distribution of content assets. In some embodiments, the service provider databases 130 may include third-party databases, such as the Nielsen® ratings database. The service provider 105 may be in communication with and/or include a traffic and billing system 150 configured to reserve inventory, determine advertising rates, configure future campaigns, and the like. In some embodiments, the traffic and billing system 150 may generally create and/or manage schedule logs that schedule the content originator's 110 advertising campaigns according to their contracts with the service provider 105. The schedule logs may include future logs, pre-logs, or any other type of schedule log for scheduling the content originator's 110 content assets.

The service provider 105 may be associated with inventory that may be made available (or "sold") to a content originator 110, such as an advertiser. The content originator 110 may include and/or have access to content originator computing devices 135, such as a server computing device, and content assets 140. A management system 145 may be in communication with the content provider 105 and may include management system computing devices 145, such as server computing devices configured to store information and/or perform functions described according to some embodiments herein. Although the management system 145 is depicted as a separate component from the service provider 105 in FIG. 1, embodiments are not so limited, as the management system may be a component of the service provider.

While optimized TV ad impression based execution enhances the value of related ad inventory, the distributed value-based TV/premium video media exchange expands the opportunity to maximize the value of inventory by providing an automated, trusted system that tracks and manages the creation and distribution of value across all of the participants involved.

System Components

Figure 2:
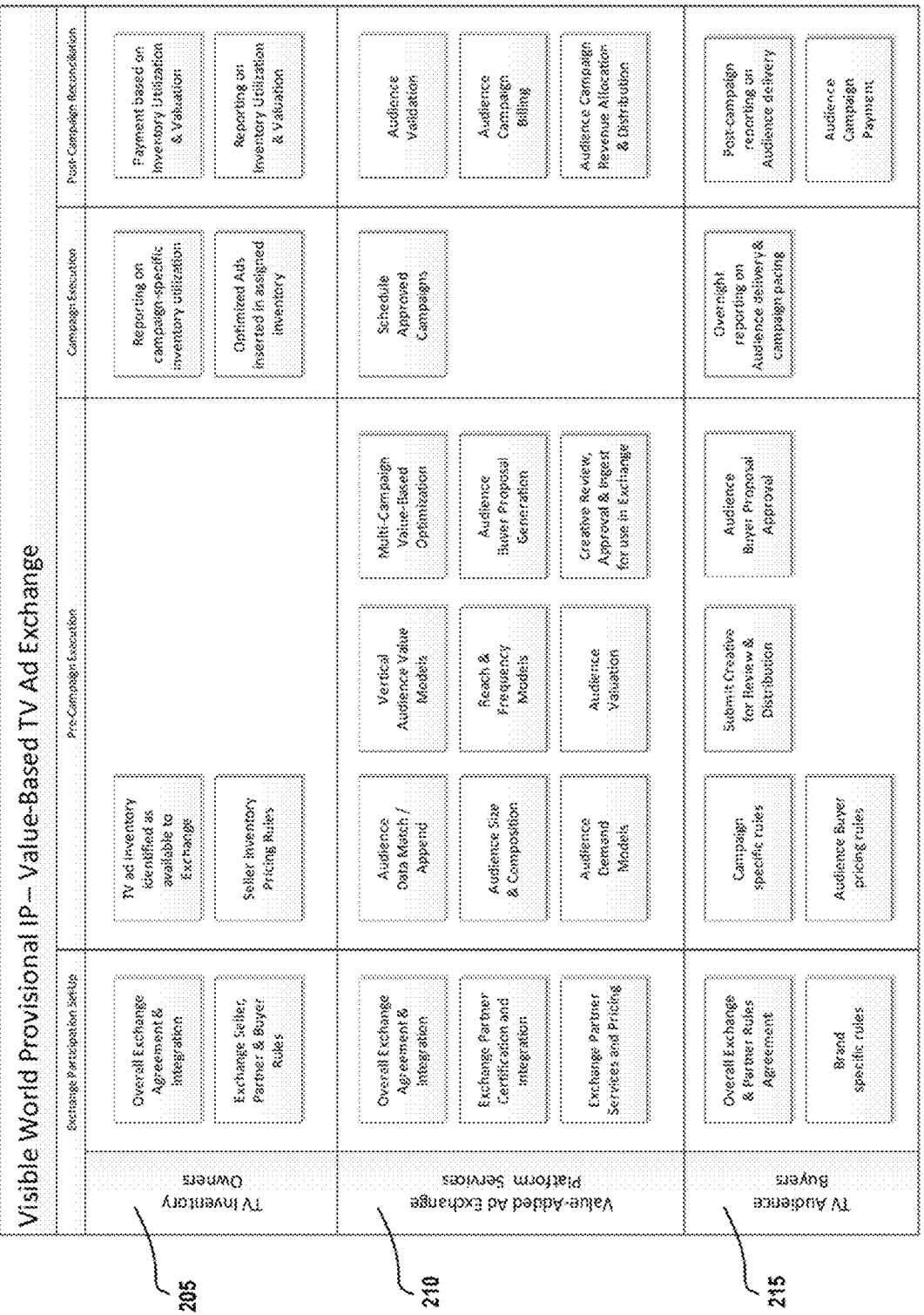
FIG. 2 depicts the system components for value-based TV media exchange execution, according to an embodiment of the invention.

Turning now to FIG. 2, in accordance with one embodiment of the invention, the system components for a system 200 for one embodiment of a value-based TV media exchange execution are depicted.

Set-Up/Initialization

According to one embodiment, participation in the exemplary TV media exchange includes certain set-up requirements and functions. Those requirements may be may be categorized across three groups that are parties to the exchange: TV media inventory owners 205, value-add exchange partners 210, and TV audience buyers 215.

TV media inventory owners provide input for the initialization and agreement to rules that govern overall partner services and related pricing. Those rules further include the provisioning of the entity, parent and/or legal entity of the TV media inventory owner and execution of an exchange master services agreement.

Another set-up, or initialization, requirement for the TV media inventory owners, according to one embodiment, is the implementation of Application Programming Interface (API) linkage, Traffic & Billing (T&B) and play-out system integration that allows the value-based exchange to automatically identify inventory available for inclusion as well as exchange related pre-approved types of information. The system also integrates the ability to execute campaigns related to approved inventory, including but not limited to: inventory availability identification (specific inventory, dynamic rules/price driven); inventory context (Geography, Program, Network, Day/Date/Time); and inventory pricing parameters (Minimum cost-per-mille ("CPM"), Fixed Cost).

TV media inventory owners may also provide input for creation of, and agreement to, rules that govern seller and buyer (agency and/or brand) relationships. Those rules may include, but are not limited to: special agency and/or brand relationships/agreements and related impact on pricing as well as conditions relative to acceptable/disallowed creative content. The exchange value-add partners may be qualified for participation and compliance with seller/buyer rules, including, but not limited to, overall and seller/buyer-specific accreditation requirements.

The exchange value-add partners, like the inventory owners, provide input for set-up and agree to rules that govern overall partner services and related pricing, including the entity, parent and/or legal entity of the exchange services partner as well as the execution of an exchange master services agreement. The exchange value-add partners may also implement Application Programming Interface (API) linkage that allows the value-based exchange to automatically access and provide pre-approved types of information associated with their value-add services. According to one embodiment, exemplary information provided may include, but is not limited to, aggregated historical audience demand and price clearance related information, aggregated forecasts for expected upcoming audience supply and demand, and detailed information regarding data inputs, methodology, and pricing associated with services provided.

The exchange value-add partners may also provide input for the initialization and/or update of available services, parameters and related pricing. According to one embodiment, those services may include, but are not limited to, the type of data and data sets available, coverage and update frequency; data matching and related match rates; audience size and composition estimation and methodology; audience demand models and methodology; vertical audience value models and methodology; audience reach and frequency models and methodology; audience valuation models and methodology; multi-campaign value-based optimization and methodology; audience buyer proposal generation and methodology; and creative review and approval and methodology.

Turning to the TV audience buyers, like the inventory owners and the value-add partners, the buyers may also provide input for creation of, and agreement to, rules that govern partner services offered within the Value-based exchange and related pricing, including the entity, parent and/or legal entity of the exchange services partner and the execution of exchange master services agreement.

The TV audience buyers may also create and/or select rules to govern proper treatment of brand placement, including but not limited to, threshold for disqualified audience composition (e.g. Adult product brand wants no less than 90% adults); type of disqualified content composition (e.g. Children brand wants no explicit content); day/day-part inclusions or exclusions (e.g. Sleep aid brand only wants night time ads)

Pre-Campaign TV Media Exchange Inputs and Functions

Once the exchange has been set-up, certain other inputs and functions may be established prior to execution of the campaign. According to one embodiment, TV media inventory owners may provide information to the exchange regarding the inventory the owners are willing to make available to the value-based TV media exchange. That information may include any data or details relating to the media inventory that would be relevant to the distribution, execution and exchange of campaign media. For example, inventory information may include, the entity of the TV media inventory owner as well as the type of inventory that the TV media inventory owner is making available. The types of inventory may include, without limitation, Linear TV ads, On-Demand TV ads, and/or Household Addressable TV ads (Linear or On-Demand).

Additional information relating to the media inventory may also provide the context associated with each unit of media inventory being made available. For example, data such as: Geography (National, Regional, Market(s), Households); Network (Name); Program (Name, Season, Episode); Program Type (Genre, Live vs. Prerecorded, Special, Premiere); Program Duration; and/or Day/Date/Time, may be provided to provide contextual limitations or presentation information relating to the offered media inventory.

Additionally, TV media inventory owners may provide information regarding the pricing associated with each unit of media inventory the owners are making available to the value-based exchange. According to one embodiment, such pricing information may include, without limitation, fixed amount (100% clearance); minimum CPM; and/or incremental charges (e.g. Fee or percentage increase for specific media pod location placement or competitive separation rules)

During the pre-campaign execution stage, value-add exchange partners may carry out services on inventory and related information made available by TV media inventory owners (for which the inventory owners have approved related pricing). The cost of these exchange partner services may be incorporated within the related audience pricing services. The pricing related services may include, but are not limited to data matching, data append, audience size and composition estimation, audience demand models, vertical audience value models, and audience valuation models.

The TV audience buyers, according to one embodiment, may provide campaign-specific rules and information that may include, but are not limited to, target audience definition and/or $1^{st}$ party data available to define target audience; value-add services the buyers are willing to pay for and are included in the audience cost; sellers they want to include/exclude from the campaign; and/or audience context restrictions that the buyers may want to include/exclude from the campaign. Those restrictions may include, without limitation, contextual information including geography, day/date/time, and competitive factors (e.g. separation rules relative to competitor ads).

TV audience buyers may also provide campaign-specific pricing and/or agreement to related pricing rules, including but not limited to fixed amount (100% clearance), minimum CPM, and extra charges (e.g. for specific pod placement or competitive separation rules).

As with the inventory, exchange partners may carry out value-add services on target audience and related information made available by the TV audience buyers. The cost of these exchange partner services may be included in the cost of the related audience pricing. These services may include, but are not limited to, data matching, data append, audience size and composition estimation, audience demand models, vertical audience value models, audience reach and frequency models; audience valuation models.

According to one embodiment, as TV inventory owners and TV audience buyers submit the requisite information, the value-based TV media exchange proceeds to automatically perform value-based optimization across all of the available inventory and all of the available campaigns that are ready to receive proposals or are currently being executed. The value-based TV media exchange automatically generates proposals for all initiated campaign requests, which the TV audience buyers may then approve, partially approve or reject. In the case of a rejection, a new proposal may be generated.

TV audience buyers may submit campaign-specific creative for review and approval by an accredited exchange partner who, for TV media owners, reviews and approves, partially approves where the creative qualifies, or rejects the creative, and sends notification to the TV audience buyers. The approved creative is ingested into the exchange platform for use with TV media inventory associated the TV audience acquired for the campaign. If the creative is only partially approved, the TV audience buyer may notified of the option to resubmit creative or regenerate a proposal plan taking into account to what extent the creative has been approved.

Campaign Execution TV Media Exchange Functions and Outputs

Once the initialization and pre-campaign execution stages are completed, according to one embodiment of the invention, the campaign may be executed. Once TV audience buyers approve a plan for which creative has been approved, the value-based TV media exchange may proceed to distribute the creative and campaign execution instructions to the nodes of the system that interface with the TV inventory owners' scheduling and media insertion systems, described above in connection with FIG. 1.

According to one embodiment, the value-based TV media exchange automatically carries out value-based optimization, on an on-going basis, across all inventory and all campaigns that are being executed. Additionally, all campaign schedules may be optimized throughout the campaign, taking into account the campaign performance to date in terms of the contracted level of target audience delivery.

In further accordance with an embodiment, the value-based TV media exchange may, on an on-going basis provide reports and other campaign-related data. According to one embodiment, the exchange may automatically report on a daily basis back to TV inventory owners with details as to campaign-specific utilization of their contributed inventory. The value-based TV media exchange may also automatically report on a daily basis back to TV audience buyers with details as to campaign-specific target audience delivery and campaign pacing relative to the contracted goals for target reach and impression levels.

Post-Campaign Execution TV Media Exchange Functions and Outputs

According to one embodiment, as soon as a specific campaign ends, the value-based TV media exchange may automatically report to TV inventory owners with details as to campaign-specific utilization of their contributed inventory. After the campaign end, the value-based TV media exchange may also automatically report to TV audience buyers with details as to the target audience delivery relative to the contracted goals for target reach and impression levels.

TV audience buyers, in accordance with one embodiment, may also request campaign-specific audience validation from an accredited exchange partner who may have independent methods to detect media insertion or creative exposure. The accredited exchange partner may also provide estimated target audience impressions and/or reach. If the accredited exchange partner's measurements are above or within a margin of error for the executed campaign, the value-based TV media exchange may then confirm the campaign as executed and third party validated. If the target audience measurement falls below the contracted impression and/or reach, the TV audience buyer may be notified of the shortfall and be given the option to resubmit the campaign in an effort to obtain the differential audience impressions or request a credit to be applied to future campaigns.

The value-based TV media exchange, in accordance with embodiments of the invention, may use the information associated with completed campaigns to automatically bill the TV audience buyers and to issue payment to the TV inventory owners based on the specific use of the owners inventory and related audience valuation across all related campaigns.

Unlike traditional systems that look to optimize TV advertising at an individual campaign or TV media inventory owner level, the distributed value-based TV/premium media exchange expands the opportunity to maximize the value of inventory by providing an automated, trusted system that tracks and manages the creation and distribution of value across all of the participants involved.

Value-Add Services Enabled by the Value-Based TV Media Exchange

According to one embodiment of the invention, the value-based TV media exchange may automatically execute a number of value-added services that have been implemented by exchange partners. Many types of services can be made available within the exchange. TV inventory owners may opt in to use these services in conjunction with the media inventory the owners have approved for inclusion within the exchange. TV owners may also agree to have the related costs be included as a percentage or set fee within the cost of the exchange inventory that involves use of the services. TV audience buyers also may to opt in to accept exchange services of interest and their related cost. Contracted partner exchange services may be automatically used to determine how inventory is valued and how audiences are selected. The cost of the contracted exchange services may be incorporated into the related audience pricing.

According to one embodiment some of the core value-add services provided by the value-based TV/premium media exchange are similar to advances in methods and systems that enable impression-based TV advertising systems and methods, like those previously described herein and in U.S. patent application Ser. No. 14/729,873, entitled "Dynamic Television Advertising Schedule Optimization And Execution," filed Jun. 3, 2015. Like those systems, the value-based TV media exchange may enable an aggregated view of audiences across linear TV and non-linear VOD/premium video advertising inventory. These systems may also perform audience estimation, proposal generation, scheduling and execution, across TV campaign schedules in order to optimally deliver the impression and other goals of the active campaigns. The value-based TV media exchange, however, expands the opportunity to maximize the value of inventory by providing an automated, trusted system that tracks and manages the creation and distribution of value across all TV/premium media inventory owners, value-add exchange partners, and TV/video audience buyers.

TV advertising is proven to deliver efficient audience reach, as documented in Chapter 6 of *How Brands Grow* 2 from Oxford Press 2016, Brian Sharp's sequel to *How Brands Grow*, which was Advertising Age's book of the year in 2014. The TV/premium media exchange enables greater value creation by aggregating audiences across participating TV/premium video inventory owners. Because the most basic function of advertising is to reach its intended audience, aggregation makes it possible to plan and execute campaigns that are optimized to reach target audiences. In addition, the ability to match viewing and consumer data may make it possible to leverage the scale of the TV media exchange to optimize campaign reach of specific advertiser-defined target audiences. Being able to execute on a large scale may help attract a greater number of TV audience buyers interested a broader variety of audience types. Further, increased demand may make it possible to extract greater value from the TV media inventory.

Figure 3:
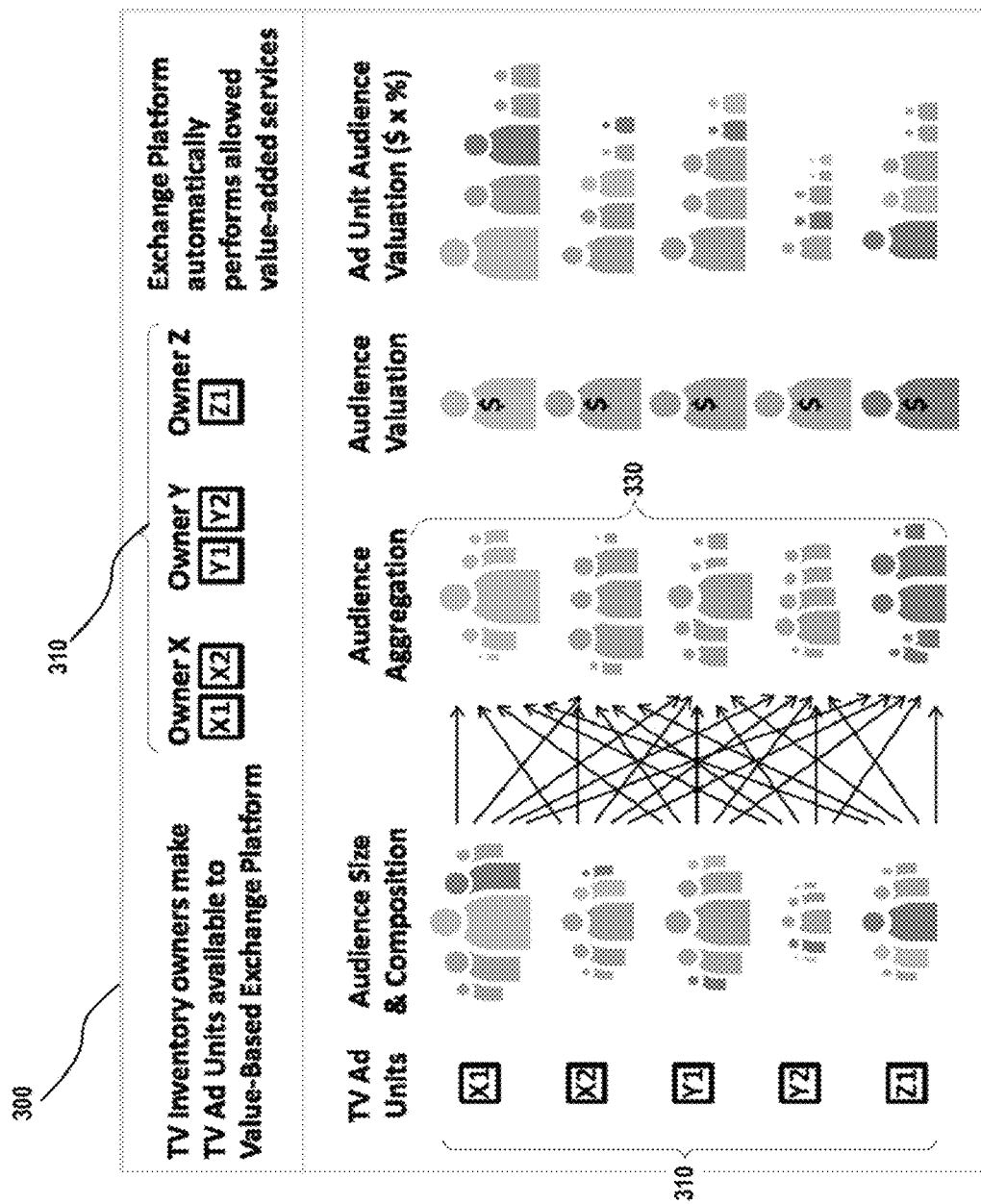
FIG. 3 depicts an illustration of value-add Services performed by the value-based TV media exchange, in accordance with an embodiment of the invention.

Turning now to FIG. 3, examples of how the TV media exchange works are depicted and described below. For simplicity purposes, these examples involve a use case with five media units 310 from three TV media inventory providers 320, composed of five audience types 330, and describes four of the more essential value-add services provided by the TV media exchange. One of skill in the art would recognize these numbers as exemplary and appreciate that the numbers of media units, inventory owners, audience types and value-add services may be readily increased or decreased within the constraints of the invention.

Audience Size & Composition

According to one embodiment, the TV/premium media inventory is matched against audience data to quantify the size and composition. As the example of FIG. 3 illustrates, the TV media inventory providers can make available any number of media, or media units comprised of different audience types. For each media unit, the corresponding audience size may be determined by matching network, time and type (national, local or targeted at a zone, household or device level) of the TV/premium media insertion, to one or more audience viewing data sources. The audience composition associated with each media unit is determined by matching audience and/or consumer segment-specific data to viewing data to then model the likelihood of a particular audience segment within each network, time and type of media insertion. The audience composition may be further defined by having a trusted third party perform a blind match (to protect consumer privacy) between the specific households with the subscribers and/or devices exposed to the media unit.

While determining audience size and composition is possible using traditional impression-based TV advertising systems and methods, embodiments of the value-based TV media exchange provide a technical advantage allowing the system to track and store the audience size and composition associated with each of the individual media units. The TV media exchange may also track and store of any related business rules such as a minimum cost per thousand for any audience impressions associated with the media unit, including metadata such as the media inventory owner name, media insertion details associated with the media unit, the accredited data and exchange partners used to determine the audience size and composition, as well as other potentially useful information.

Audience Aggregation

According to one embodiment, the audiences associated with the TV/premium media inventory may be aggregated to determine the amount of audience by type of audience. In the scenario depicted in FIG. 3 example, the five audience types associated with the TV media units are aggregated into five single audience type pools. Again while such audience aggregation is possible using impression-based TV advertising systems and methods, embodiments of the value-based TV media exchange may track and store which individual media units contribute any amount of specific audience type, along with all other relevant metadata.

Audience Valuation

According to one embodiment of the invention, the value of the audiences associated with the TV/premium media inventory may be derived using a variety of relevant consumer and historical audience valuation data. The data and models that determine audience valuation may be provided by one or more of the accredited exchange partners. Both TV media inventory owners as well as TV audience buyers may agree to use any number of audience valuation partners and then abide by the related audience valuation methods and outcomes. The value-based TV media exchange may track and store the audience value associated with each audience type, along with relevant metadata including the accredited data and audience valuation partners involved as well as their costs which are incorporated into the overall audience cost.

Media Unit Audience Valuation

According to one embodiment, the value of the audiences associated may be used to determine the specific audience value contributed by individual media units. This information in conjunction with the incremental costs associated with the use of the accredited data, audience, valuation and/or other exchange services may be used to determine how the proceeds from the sale of specific audiences are distributed among all of the value-based TV/premium media exchange participants involved in each executed campaign.

Value Allocation and Distribution Managed by the Value-Based TV Media Exchange

The technically advantageous manner in which embodiments of the value-based TV media exchange operates also serves as an attraction to increase participants. The system functions as an automated, trusted system that may track and manage the creation and distribution of value across all TV/premium media inventory owners, value-add exchange partners, and TV/video audience buyers. The value-based TV media exchange provides a technical advantage in the system's ability to automatically execute data-driven business rules, while keeping track of and storing all of the relevant detail, calculating and determining the impact on the transacted audience value, and enabling the accurate and efficient capture and distribution of value contributed by each of the participants involved.

Figure 4:
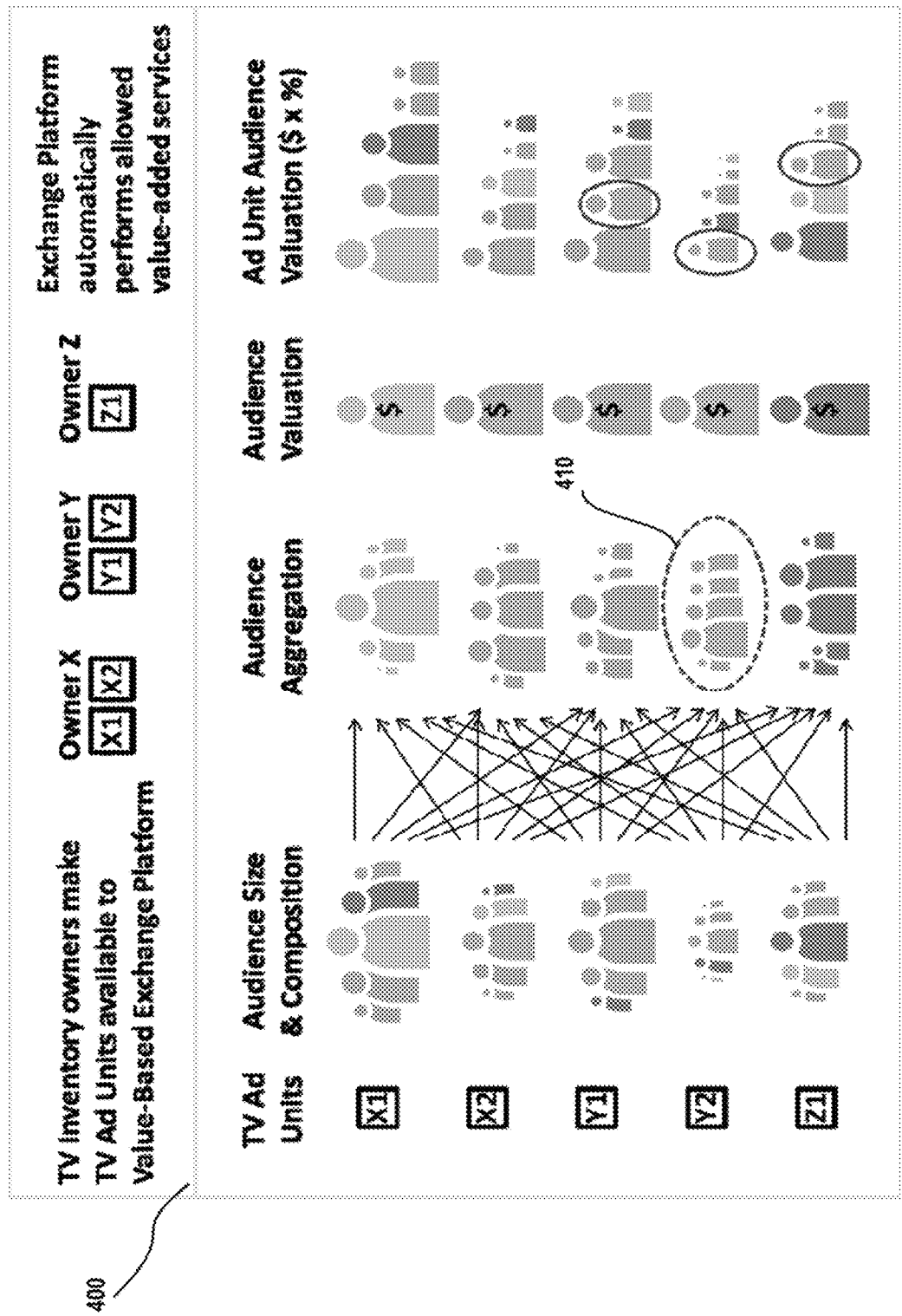
FIG. 4 depicts an illustration of audience value distribution performed by the value-based TV media exchange, in accordance with an embodiment of the invention.

FIG. 4 depicts how, according to one embodiment, the value-based TV media exchange tracks the relevant information and value associated with each value-add process involved. In the particular example of FIG. 4, a specific audience 410 may be acquired at a particular price that satisfied the criteria of some of the TV media inventory owners (Y1, Y2 and Z1) but not others (X1 and X2). In order to enable such a specific transaction, a series of value-add exchange services may be implemented. Those services are implemented through the execution of a variety of actions by the participants. TV and/or premium media inventory may be contributed by multiple owners and media inventory owners may set inputs as to pricing minimums, pricing for guaranteed audience delivery, and/or special pricing agreements with specific exchange platform participants. The opted-in services of one or more accredited exchange platform partners may automatically determine the size, composition and valuation of the audiences associated with the contributed units. TV and/or premium media inventory buyers may place bids and/or agree to audience guarantee pricing to secure desired target audiences. The exchange platform may use the approved data and services made available by exchange partners and then perform optimization operations based on the business rules pre-set by buyers and sellers. The exchange platform may interface with TV inventory owners and exchange platform services partner systems in order to automatically execute and validate execution of the contracted campaigns. TV inventory owners and exchange platform services partners may be compensated according to rules associated the relevant inventory contributed, and the value added via data and services.

The Value-Based TV Media Exchange's Distributed Digital Ledger

Blockchain technology provides a mechanism allowing people to trust each other. This critical capability is why the use of Blockchain has surpassed traditional basic finance functions in many regards. It is already being used to record anything that can be digitized, including: birth and death certificates, marriage licenses, deeds and titles of ownership, educational degrees, medical records, contracts, and votes.

As implemented in embodiments of the value-based TV media exchange, the Blockchain technology may serve as an incorruptible digital ledger that allows data to be stored in a variety of different places across all of the exchange participants. This, in turn, enables secure implementation of business rules and tracking of the media inventory and/or audiences and value-added contributions of the various participating TV and premium media inventory partners and other platform exchange partners. The distributed nature of embodiments of the value-based TV media exchange provides a technical advantage in that the system operates, not as a centralized system under the control of a single operator, but instead as a secure and accountable system that runs according to the business and pricing rules to which the participants have chosen and agreed to be bound.

The value-based TV media exchange, implemented with Blockchain technology in one embodiment, allows the tracking of the creation of the goods offered by the exchange system, all the way from the initial availability of TV and premium video media inventory through the various processes that are used to aggregate and value the audiences made available to buyers. The exchange system also provides for the execution and validation of campaigns and related audience delivery.

Use of a Distributed Digital Ledger

The implementation of Blockchain Technology in one embodiment of the invention, may raise concerns as to costs and latency. While cost and latency are important metrics, these issues are not material with respect to its use within the value-based TV media exchange. Regarding cost, the initial set-up of the value-based TV media exchange across the nodes of the participants involved, particularly those that require integration with ad insertion systems is minimal. In addition, there are costs associated with the ongoing usage of Blockchain that are required to support the resolution of algorithmic keys that are performed by Blockchain "miners" and are an essential security component. Given the large value associated with the TV and premium video ad inventory that is managed by the value-based TV media exchange, however, the cost of decentralized implementation and ongoing Blockchain usage costs is inconsequential, relative to the benefits an accountable, self-policing system and trusted by its participants may deliver.

Regarding system latency, the nature of the Blockchain technology may result in a 10 minute lag between each new block of transactions (a block in the block chain) being resolved by a Blockchain "miner" and validated by a majority of the nodes across the network of participants. The delay is a result of the block being appended to the full historical body of validated blocks of transactions. Since execution of TV advertising campaigns is not presently done on a real-time basis, and creative related to TV media campaigns has to be approved and distributed ahead of being specifically used with a unit of media inventory, a 10 minute lag to ensure proper security may have little, if any, negative impact on the overall value associated with the use of TV media. However, given the exchange also contemplates use of premium online video media inventory as well as other emerging forms of more dynamic, addressable TV and video media insertion capabilities, a 10 minute lag may require that any inventory associated with an audience buy be locked down at least 10 minutes prior to its utilization. Such a requirement may be a relatively minor limitation given the overall value enabled by the system.

Figure 5:
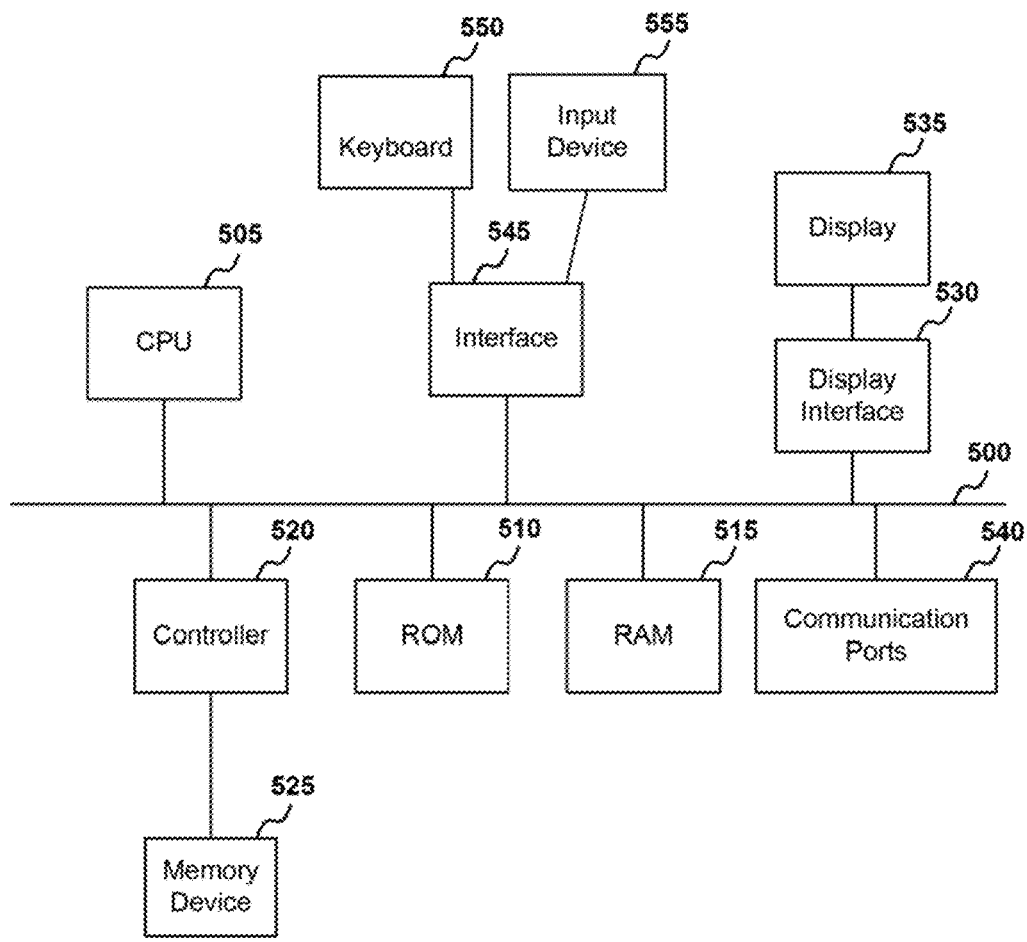
FIG. 5 depicts a block diagram of illustrative internal hardware that may be used to contain or implement program instructions according to an embodiment.

FIG. 5 depicts a block diagram of exemplary internal hardware that may be used to contain or implement program instructions, such as the modules and/or process steps discussed above in reference to FIGS. 1-4. A bus 500 serves as the main information highway interconnecting the other illustrated components of the hardware. CPU 505 is the central processing unit of the system, performing calculations and logic operations required to execute a program. CPU 505 is an exemplary processing device, computing device or processor as such terms are using in this disclosure. Read only memory (ROM) 510 and random access memory (RAM) 515 constitute exemplary memory devices.

A controller 520 interfaces with one or more optional memory devices 525 to the system bus 500. These memory devices 525 may include, for example, an external or internal DVD drive, a CD ROM drive, a hard drive, flash memory, a USB drive or the like. As indicated previously, these various drives and controllers are optional devices.

Program instructions, software or interactive modules may be stored in the ROM 510 and/or the RAM 515. Optionally, the program instructions may be stored on a tangible computer readable medium such as a compact disk, a digital disk, flash memory, a memory card, a USB drive, an optical disc storage medium, such as a Blu-Ray™ disc, and/or other recording medium.

An optional display interface 530 may permit information from the bus 500 to be displayed on the display 535 in audio, visual, graphic or alphanumeric format. Communication with external devices may occur using various communication ports 540. An exemplary communication port 540 may be attached to a communications network, such as the Internet or an intranet. Other exemplary communication ports 540 may comprise a serial port, a RS-232 port, and a RS-485 port.

The hardware may also include an interface 545 which allows for receipt of data from input devices such as a keyboard 550 or other input device 555 such as a mouse, a joystick, a touch screen, a remote control, a pointing device, a video input device, and/or an audio input device.

Computer program logic implementing all or part of the functionality previously described herein may be embodied in various forms, including, but in no way limited to, a source code form, a computer executable form, and various intermediate forms (for example, forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in a non-transitory form (for example, a source code form, a computer executable form, an intermediate form, or combinations thereof) in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink-wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

It will further be appreciated that the above-described methods and procedures may be provided using the systems disclosed herein, or on other types of systems. The methods and procedures, unless expressly limited, are not intended to be read to require particular actors or systems performing particular elements of the methods.

In the preceding specification, the present invention has been described with reference to specific example embodiments thereof. It will, however, be evident that various modifications and changes may be made thereunto without departing from the broader spirit and scope of the present invention. The description and drawings are accordingly to be regarded in an illustrative rather than restrictive sense.

What is claimed is:

1. A system comprising:
a processor; and
a non-transitory, computer-readable storage medium in operable communication with the processor, wherein the computer-readable storage medium contains one or more programming instructions that, when executed, cause the processor to:
 receive, from a plurality of computing devices and via an application programming interface, first information associated with a plurality of media inventory units, wherein the first information comprises pre-approved types of information, for secure distribution, indicating a portion of media inventory units of the plurality of media units available to be sold to a content originator;
 receive, from a computing device of the plurality of computing devices, a message associated with a request for at least one media inventory unit of the portion;
 determine, based on the first information, a proposal that fulfills the request; and
 transmit, via a network to the plurality of computing devices, a record, generated based on acceptance and execution of the proposal, comprising second information associated with the at least one media inventory unit to cause each of the plurality of computing devices to validate the record and add the record as a block to a blockchain of records.

2. The system of claim 1 wherein the computer-readable storage medium further contains one or more programming instructions that, when executed, further causes the processor to:
receive, via the network, a link to a services application programming interface, the services application programming interface linking the system to an exchange partner, wherein the services application programming interface provides access to a value-add service offered by the exchange partner.

3. The system of claim 1, wherein a pre-approved type of information comprises audience information.

4. The system of claim 1, wherein the proposal comprises audience aggregation enabling generation of at least one pool of audiences with at least one shared characteristic.

5. The system of claim 1, wherein a pre-approved type of information comprises audience valuation.

6. The system of claim 1, wherein the execution comprises a value-based optimization of the proposal.

7. The system of claim 1, wherein the system comprises a decentralized application.

8. The system of claim 1, wherein the pre-approved types of information prevent exposure of private data associated with the plurality of computing devices.

9. The system of claim 3, wherein the audience information comprises audience size and audience composition.

10. A method comprising:
receiving, from a plurality of computing devices and via an application programming interface, first information associated with a plurality of media inventory units, wherein the first information comprises pre-approved types of information, for secure distribution, indicating a portion of media inventory units of the plurality of media units available to be sold to a content originator;
receiving, from a computing device of the plurality of computing devices, a message associated with a request for at least one media inventory unit of the portion;
determining, based on the first information, a proposal that fulfills the request; and
transmitting, via a network to the plurality of computing devices, a record, generated based on acceptance and execution of the proposal, comprising information associated with the at least one media inventory unit to cause each of the plurality of computing devices to validate the record and add the record as a block to a blockchain of records.

11. The method of claim 10, further comprising:
receiving, via the network, a link to a services application programming interface, the services application programming interface providing to an exchange partner, wherein the services application programming interface provides access to a value-add service offered by the exchange partner.

12. The method of claim 10, wherein a pre-approved type of information comprises audience information.

13. The method of claim 10, wherein the proposal comprises audience aggregation enabling generation of at least one pool of audiences with at least one shared characteristic.

14. The method of claim 10, wherein a pre-approved type of information comprises audience valuation.

15. The method of claim 10, wherein the execution comprises a value-based optimization of the proposal.

16. The method of claim 10, wherein the pre-approved types of information prevent exposure of private data associated with the plurality of computing devices.

17. The method of claim 12, wherein the audience information comprises audience size and audience composition.

18. A non-transitory computer-readable storage medium storing computer-readable instructions that, when executed by a processor of a computing device, cause the computing device to perform operations comprising:
receiving, from a plurality of computing devices and via an application programming interface, first information associated with a plurality of media inventory units, wherein the first information comprises pre-approved types of information, for secure distribution, indicating a portion of media inventory units of the plurality of media units available to be sold to a content originator;
receiving, from a computing device of the plurality of computing devices, a message associated with a request for at least one media inventory unit of the portion;
determining, based on the first information, a proposal that fulfills the request; and
transmitting, via a network to the plurality of computing devices, a record, generated based on acceptance and execution of the proposal, comprising information associated with the at least one media inventory unit to cause each of the plurality of computing devices to validate the record and add the record as a block to a blockchain of records.

19. The non-transitory computer-readable storage medium claim 18, wherein a pre-approved type of information comprises audience information.

20. The non-transitory computer-readable storage medium claim 18, wherein the pre-approved types of information prevent exposure of private data associated with the plurality of computing devices.

* * * * *